Patented Aug. 27, 1935

2,012,344

UNITED STATES PATENT OFFICE 2,012,344

COMPOSITE SHEETING

Harold Alvin Levey, New Orleans, La.

No Drawing. Application January 18, 1930, Serial No. 421,811

17 Claims. (Cl. 91—68)

My invention relates to a new article of manufacture, a composite transparent water-proof sheeting made from a base film composed of a treated carbohydrate of lower molecular weight than cellulose, and preferably starch, prepared in the form of a film, this film being coated on one or both sides with a solution of a cellulose ester.

In preparing this new composite material, the film base is first made. This has been done by several methods. When starch is used, the raw starch may be from corn, potato, arrow-root, rice, cassava or the like, the toughest and strongest films having been produced from cassava starch. The dry starch may be subjected to the usual heat treatment methods, dry, with or without the use of acids, bases or salts, which results in a dextrinized starch or dextrin, which is then dissolved or peptized in water, and any foreign, or undissolved or suspended matter is then filtered out. This solution, which should contain the least possible amount of water for satisfactory working, may have some of its properties, such as strength, flexibility and viscosity, controlled by heating to moderate temperatures, and if the viscosity is to be increased, the pressure should be reduced.

The starch-derivative solution or plastic also may be prepared by the wet process consisting in mixing the starch grains with water and a small amount of acid, base, salt, catalyst, enzymatic substance, or ozone, which will break down the starch grains or peptonize them into a nearly clear solution.

Any of the carbohydrates from the starches down through most of the sugars may be used, such as "amylin", dextrines, and starch gums, the saccharides, carbohydrate gums, such as acacia or the like, pentoses, and many polyhydric alcohols of relatively high molecular weight.

The lower carbohydrates which crystallize may be subjected to heat or other treatment as described for the starches, which "inverts" some forms and converts other forms into a colloidal or amorphous form which enables them to be made into dry self-sustaining films. In addition to the above products, I have found that many other of the derivatives of the starches and sugars may be used such as their esters and ethers and starch xanthate. The starch acetates are especially suitable, as they are stable and relatively cheap. Experiments have shown that mixtures of treated starches with a starch ester, such as starch acetate or starch nitrate, produced more desirable films than either one alone, as the addition of the starch ester gives excellent binding properties when included in the plastic used for the manufacture of the starch film base, resulting in a film of substantially greater strength.

This solution is then ready to be formed into a film. A clean, smooth, true surface may be used as the medium on which to cast the plastic starch solution. This may be of glass, or other non-metallic surfaces such as synthetic and natural resins, waxes, cellulose derivatives, etc., or most metallic surfaces and their alloys; or a thinner bodied solution will form a film by casting or "flowing" it on a liquid surface such as carbon tetrachloride, and other liquids of higher specific gravity than the starch-derivative solution, and which are immiscible with it and neutral or inert to it chemically. The liquid used should preferably have a low vapor pressure and high surface tension.

If a solid forming surface is used, a pattern or configuration may be prepared thereon which will be reproduced on the dried starch film. If the ultimate starch-derivative film is thick, and the pattern on the forming surface relatively shallow, the pattern will appear on one side; while if the ultimate starch film is thin, and the depth of the pattern on the forming surface relatively great, the pattern will appear in relief on one side and in intaglio on the other.

The starch-derivative film may be dried by standing in the air under ordinary atmospheric conditions, or it may be dried much more rapidly at elevated temperatures and under reduced pressures. Standard film-forming machines such as are used for making thin sheets of gelatin or the like from water solution, as well as those used for making thin films of cellulose esters from solutions of volatile solvents, may be used, adjusted to the conditions characteristic of the particular starch solution. These will result in self-sustaining transparent starch-derivative films or sheets of indefinite length by a continuous process of manufacture.

In order to facilitate the ready removal of the dried starch-derivative film from the solid surface on which it is formed, this surface may be coated with a very thin layer or film of oily, greasy, or waxy substance spread upon the same by means of a low concentration of these substances dissolved or suspended in a suitable volatile organic solvent, as for example about a 1% solution of stearine in benzene. This inhibits a so-called complete "wetting" of the spreading surface by the starch-derivative solution. When spreading the film on waxy surfaces on which the degree of wetting is insufficient for satisfactory film-forming, this condition can be controlled by treating the surface with a strong water solution of the soaps of the fatty acids, sulphonic acids and their anilides and amides.

If the starch-derivative sheet is to be made more flexible, plasticizers may be added to the starch-derivative solution such as glycerol, glycol, the acetines and other miscible, water-soluble organic compounds.

After the dry, thin, transparent sheet of treated starch has been prepared, it is then coated. This treatment renders it water-proof, improves the transparency, strength, flexibility, and "sheen" or brilliancy of surface. Before the coating operation, however, the starch-derivative film may, if desired, be molded into various shapes, such as drinking cups, soda water straws, and various other articles wherein impermeability to moisture is a desirable quality. The preferred coating solution consists of cellulose nitrate dissolved in suitable solvents to which has been added a plasticizer and a small amount of a wax-like substance to improve the waterproofness of this dried coating. However, other cellulose derivative solutions may be employed, such as cellulose acetate and cellulose methyl or ethyl ether in their respective solvents to which have been added their proper plasticizers, etc., as described above for the nitrate.

While I prefer to use films of cellulose derivatives as covering for my starch base because of their many desirable properties and ease and cheapness of application, it is obvious that many other coatings may be satisfactorily substituted. Among these may be mentioned the oleo-resinous varnishes, phenol-aldehyde and other synthetic resin varnishes, and solutions of natural resin gums and the like.

If the cellulose derivative coating solution is relatively dilute and very fluid, it will penetrate the starch-derivative film, while if it is concentrated and very viscous it will form a surface coating layer rather than penetrate the starch-derivative base film; intermediate conditions can be obtained by controlling this factor. The degree of penetration may also be increased by adding to the coating solution organic solvents containing hydroxyl groups like methyl or ethyl alcohol, ethylene glycol, the glycol ethers and the like.

These coating solutions may be applied by dipping or passing the starch film through the coating solution, by spraying, brushing or printing and may be applied to one or both sides. I have also observed that when employing a film base made from a treated starch mixed with a starch ester, penetration results to a considerably lesser degree than when the pure treated starch alone is used; so that a film made up of treated starch mixed with a starch ester results in a more satisfactory film by coating than by the impregnation treatment.

My invention may be illustrated in its preferred form by the following example: Cassava starch finely powdered is macerated with about six times its weight of water to which has been added about 1%, based on the weight of the water, of sodium or ammonium hydroxide and about 1% of glycerol. This mass is heated with stirring in a water jacketed vessel, preferably of glass to avoid discoloration. The heating is complete when the mass is a smooth slightly turbid jell nearly free from lumps. This is filtered under pressure through a very fine screen. This solution is then spread upon a clean piece of glass, which may be greased slightly as described above, and the solution gaged down to the film of the desired thickness with a knife, while the superfluous portion is returned to the storage vessel. When this film has dried, it is peeled off the glass plate and dipped in a solution of cellulose nitrate made up of three parts by weight of cellulose nitrate, one part of tricresyl phosphate and about fifty parts of butyl acetate, or an equivalent amount of mixed solvents and diluents. This will produce a coating on the starch-derivative film (which should be about 0.001 inch thick) of about 0.0001 inch thick. Coloring matter and/or pigments may be introduced into the starch base and/or the cellulose coating solution.

This new article of manufacture is a transparent water-proof flexible composite sheet which is highly suited as a transparent waterproof wrapping for food products which may come in contact with the wrapping as it is waterproof, odorless and tasteless, and also as a general wrapping medium, as a surgical dressing tissue and impervious membrane as in sanitary napkins, etc., as electrical insulating sheets in condensers, coils, etc., as color screens for theatre, show window and advertising displays, etc.

In the claims, the words "coat" and "impregnate" are used interchangeably to include both operations, since, as clearly brought out above, the material which is applied to the base may be exclusively an impregnation, the impregnating sheet having precisely the same thickness as the unimpregnated sheet, or a coating in the strict sense of the word. Also, the word "derivative", as used in the claims as modifying "carbohydrate" or "starch", should be read as including a degradation product or depolymerization product, inasmuch as certain of the treatments described above do not produce chemical "derivatives", strictly speaking, but products of the types just specified.

I claim:

1. A new article of manufacture, consisting of a transparent flexible composite sheet suitable for wrapping articles made up of a thin base film of a starch derivative and containing a plasticizer coated with a water-proof protective film.

2. A new article of manufacture, consisting of a transparent flexible composite sheet suitable for wrapping articles composed of a thin dextrinized starch base containing a plasticizer and impregnated with a solution rendering said sheet water-proof.

3. A new article of manufacture, consisting of a transparent flexible composite sheet suitable for wrapping articles composed of a thin dextrinized starch base containing a plasticizer and impregnated with a solution of a cellulose derivative in a suitable solvent, which, on evaporation of the solvent, renders the sheet water-proof.

4. A new article of manufacture, consisting of a transparent flexible composite sheet suitable for wrapping articles composed of a thin dextrinized starch base containing a plasticizer and impregnated with a solution of resins in suitable solvents, which, on evaporation of the solvents, renders the sheet water-proof.

5. A new article of manufacture, consisting of a transparent flexible composite sheet suitable for wrapping articles composed of a base film of dextrinized starch mixed with a starch ester, and coated with a water-proof protective film.

6. A new article of manufacture, consisting of a transparent flexible composite sheet composed of a base film of dextrinized starch mixed with starch nitrate, and coated with a water-proof protective film.

7. A new article of manufacture, consisting of a transparent flexible composite sheet composed of a base film of dextrinized starch mixed with a starch ester, and a cellulose ester coating thereon.

8. A transparent and highly flexible composite sheet suitable for wrapping articles comprising a base film formed of a member of the group consisting of starch, derivatives, saccharides, carbohydrate gums, pentoses, and ethers and esters thereof, said member having been modified to render the same capable of forming a dry, self-sustaining film, and containing a plasticizer, said film being impregnated with a water-proof material.

9. A transparent and highly flexible composite sheet suitable for wrapping articles comprising a base film formed of a member of the group consisting of starch derivatives, saccharides, carbohydrate gums, pentoses, and ethers and esters thereof, said member having been modified to render the same capable of forming a dry, self-sustaining film, and containing a plasticizer said film being impregnated with a cellulose ester.

10. A transparent and highly flexible composite sheet suitable for wrapping articles comprising a base film formed of a member of the group consisting of starch derivatives, saccharides, carbohydrate gums, pentoses, and ethers and esters thereof, said member having been modified to render the same capable of forming a dry, self-sustaining film, and containing a plasticizer, said film being impregnated with a natural resin.

11. A transparent and highly flexible composite sheet suitable for wrapping articles comprising a base film formed of a mixture of a starch ester with a member of the group consisting of starch derivatives, saccharides, carbohydrate gums, pentoses, and ethers and esters thereof, said member having been modified to render the same capable of forming a dry, self-sustaining film, and containing a plasticizer, said film being impregnated with a water-proof material.

12. A transparent and highly flexible composite sheet suitable for wrapping articles comprising a base film formed of a mixture of a starch ester with a member of the group consisting of starch derivatives, saccharides, carbohydrate gums, pentoses, and ethers and esters thereof, said member having been modified to render the same capable of forming a dry, self-sustaining film, and containing a plasticizer, said film being impregnated with a cellulose ester.

13. A transparent and highly flexible composite sheet suitable for wrapping articles comprising a base film formed of a mixture of a starch ester with a member of the group consisting of starch derivatives, saccharides, carbohydrate gums, pentoses, and ethers and esters thereof, said member having been modified to render the same capable of forming a dry, self-sustaining film, and containing a plasticizer, said film being impregnated with a natural resin.

14. A transparent and highly flexible composite sheet suitable for wrapping articles comprising a base film formed of a member of the group consisting of starch derivatives, saccharides, carbohydrate gums, pentoses, and ethers and esters thereof, said member having been modified to render the same capable of forming a dry, self-sustaining film, and containing a plasticizer, said film being impregnated with a resin.

15. A transparent and highly flexible composite sheet suitable for wrapping articles comprising a base film formed of a mixture of a starch ester with a member of the group consisting of starch derivatives, saccharides, carbohydrate gums, pentoses, and ethers and esters thereof, said member having been modified to render the same capable of forming a dry, self-sustaining film, and containing a plasticizer, said film being impregnated with a resin.

16. A product as defined in claim 8, in which said water-proof material comprises a cellulose derivative to which has been added a relatively small quantity of a wax-like substance.

17. A product as defined in claim 8, in which said water-proof material comprises a cellulose nitrate to which has been added a relatively small quantity of a wax-like substance.

HAROLD ALVIN LEVEY.